(12) United States Patent
Bober (10) Patent No.: US 9,214,888 B2
(45) Date of Patent: Dec. 15, 2015

(54) PRE-CHARGING SYSTEM FOR A CAPACITOR IN A VOLTAGE INVERTER FOR AN ELECTRIC MOTOR

(71) Applicant: LG Chem, Ltd., Seoul (KR)

(72) Inventor: Greg Bober, Saint Clair Shores, MI (US)

(73) Assignee: LG Chem, Ltd., Seoul (KR)

( * ) Notice: Subject to any disclaimer, the term of this patent is extended or adjusted under 35 U.S.C. 154(b) by 61 days.

(21) Appl. No.: 14/135,899

(22) Filed: Dec. 20, 2013

(65) Prior Publication Data
US 2015/0180400 A1 Jun. 25, 2015

(51) Int. Cl.
H02P 27/08 (2006.01)
H02P 27/04 (2006.01)

(52) U.S. Cl.
CPC ....................... H02P 27/04 (2013.01)

(58) Field of Classification Search
None
See application file for complete search history.

(56) References Cited

U.S. PATENT DOCUMENTS

| | | | |
|---|---|---|---|
| 5,408,842 A | 4/1995 | Goto et al. | |
| 6,438,044 B2 * | 8/2002 | Fukuda | 365/200 |
| 6,654,262 B2 | 11/2003 | Hussein et al. | |
| 7,400,116 B2 | 7/2008 | Kato et al. | |
| 7,688,023 B2 | 3/2010 | Yoon et al. | |
| 8,456,878 B2 | 6/2013 | Min | |
| 2005/0219195 A1 * | 10/2005 | Yano et al. | 345/100 |
| 2006/0076934 A1 * | 4/2006 | Ogata et al. | 320/136 |
| 2010/0225258 A1 * | 9/2010 | Namuduri | B60K 6/485 318/400.3 |
| 2011/0049977 A1 | 3/2011 | Onnerud et al. | |
| 2015/0084404 A1 * | 3/2015 | Hashim et al. | 307/9.1 |

FOREIGN PATENT DOCUMENTS

| | | |
|---|---|---|
| JP | 767214 A | 3/1995 |
| KR | 20100104079 A | 9/2010 |

OTHER PUBLICATIONS

U.S. Appl. No. 14/105,219 filed on Dec. 13, 2013 entitled Pre-Charging System for a Capacitor in a Voltage Inverter for an Electric Motor.
Provisional U.S. Appl. No. 61/910,497 filed on Dec. 2, 2013 entitled Pre-Charging System for a Capacitor in a Voltage Inverter for an Electric Motor.

(Continued)

Primary Examiner — Eduardo Colon Santana
Assistant Examiner — Cortez Cook
(74) Attorney, Agent, or Firm — Buckert Patent & Trademark Law Firm, PC; John F. Buckert (57) ABSTRACT

A pre-charging system for a capacitor in a voltage inverter for an electric motor is provided. The system includes a microprocessor that generates a first control signal, and a pre-charging circuit coupled to the microprocessor. The pre-charging circuit has a counter circuit, a voltage pulse generating circuit, and a drive circuit. The counter circuit generates a first plurality of voltage pulses, in response to the first control signal. The voltage pulse generating circuit generates each voltage pulse of a second plurality of voltage pulses at a respective time interval while an instantaneous current flowing through a pre-charging resistor is less than a threshold level. The drive circuit has a transistor that outputs a third plurality of voltage pulses in response to the second plurality of voltage pulses to increase a voltage across the capacitor.

10 Claims, 8 Drawing Sheets

(56) References Cited

OTHER PUBLICATIONS

U.S. Appl. No. 14/135,899 filed on Dec. 20, 2013 entitled Pre-Charging System for a Capacitor in an Electric Motor Voltage Inverter.

U.S. Appl. No. 14/221,316 filed on Mar. 21, 2014 entitled Pre-Charging and Voltage Supply System for a DC-AC Inverter.

U.S. Appl. No. 14/258,113 filed on Apr. 22, 2014 entitled Voltage Supply System and Method for Disabling Operation of a DC-DC Voltage Converter.

* cited by examiner

| S1 | S2 | R1 | R2 | R3 | | SOUT | ROUT |
|---|---|---|---|---|---|---|---|
| X | X | 0 | X | X | | 0 | 1 |
| X | X | X | 0 | X | | 0 | 1 |
| X | X | X | X | 0 | | 0 | 1 |
| 0 | X | 1 | 1 | 1 | | 1 | 0 |
| 1 | 0 | X | X | X | | 1 | 0 |

FIG. 22

PRE-CHARGING SYSTEM FOR A CAPACITOR IN A VOLTAGE INVERTER FOR AN ELECTRIC MOTOR

BACKGROUND

The inventor herein has recognized a need for a pre-charging system for a capacitor in a voltage inverter for an electric motor that monitors an instantaneous current flowing through a pre-charging resistor and into the capacitor and limits an instantaneous current level to prevent degradation of the pre-charging resistor and the voltage inverter.

SUMMARY

A pre-charging system for a capacitor in a voltage inverter for an electric motor in accordance with exemplary embodiment is provided. The pre-charging system includes a microprocessor programmed to generate a first control signal. The pre-charging system further includes a pre-charging circuit operably coupled to the microprocessor. The pre-charging circuit has a counter circuit, a voltage pulse generating circuit, and a drive circuit. The counter circuit is configured to generate a first plurality of voltage pulses, in response to the first control signal. The voltage pulse generating circuit is configured to generate each voltage pulse of a second plurality of voltage pulses at a respective time interval while an instantaneous current flowing through a transistor and a pre-charging resistor electrically coupled to the capacitor is less than or equal to a threshold instantaneous current level. The drive circuit has the transistor and the pre-charging resistor electrically coupled to the transistor. The transistor is configured to be electrically coupled between a high voltage terminal of a battery pack and the capacitor in the voltage inverter. The transistor is configured to output a third plurality of voltage pulses in response to the second plurality of voltage pulses to increase a voltage across the capacitor in the voltage inverter.

A method for pre-charging a capacitor in a voltage inverter for an electric motor in another exemplary embodiment is provided. The method includes providing a pre-charging system having a microprocessor and a pre-charging circuit operably coupled to the microprocessor. The pre-charging circuit has a counter circuit, a voltage pulse generating circuit, and a drive circuit. The drive circuit has a transistor and a pre-charging resistor electrically coupled to the transistor. The transistor is configured to be electrically coupled between a high voltage terminal of a battery pack and the capacitor. The method includes generating a first control signal utilizing the microprocessor. The method further includes generating a first plurality of voltage pulses, in response to the first control signal, utilizing the counter circuit. The method further includes generating each voltage pulse of a second plurality of voltage pulses utilizing the voltage pulse generating circuit, at a respective time interval while an instantaneous current flowing through the transistor and the pre-charging resistor is less than or equal to a threshold instantaneous current level. The method further includes outputting a third plurality of voltage pulses utilizing the transistor in response to the second plurality of voltage pulses to increase a voltage across the capacitor in the voltage inverter.

DETAILED DESCRIPTION

Figure 1:
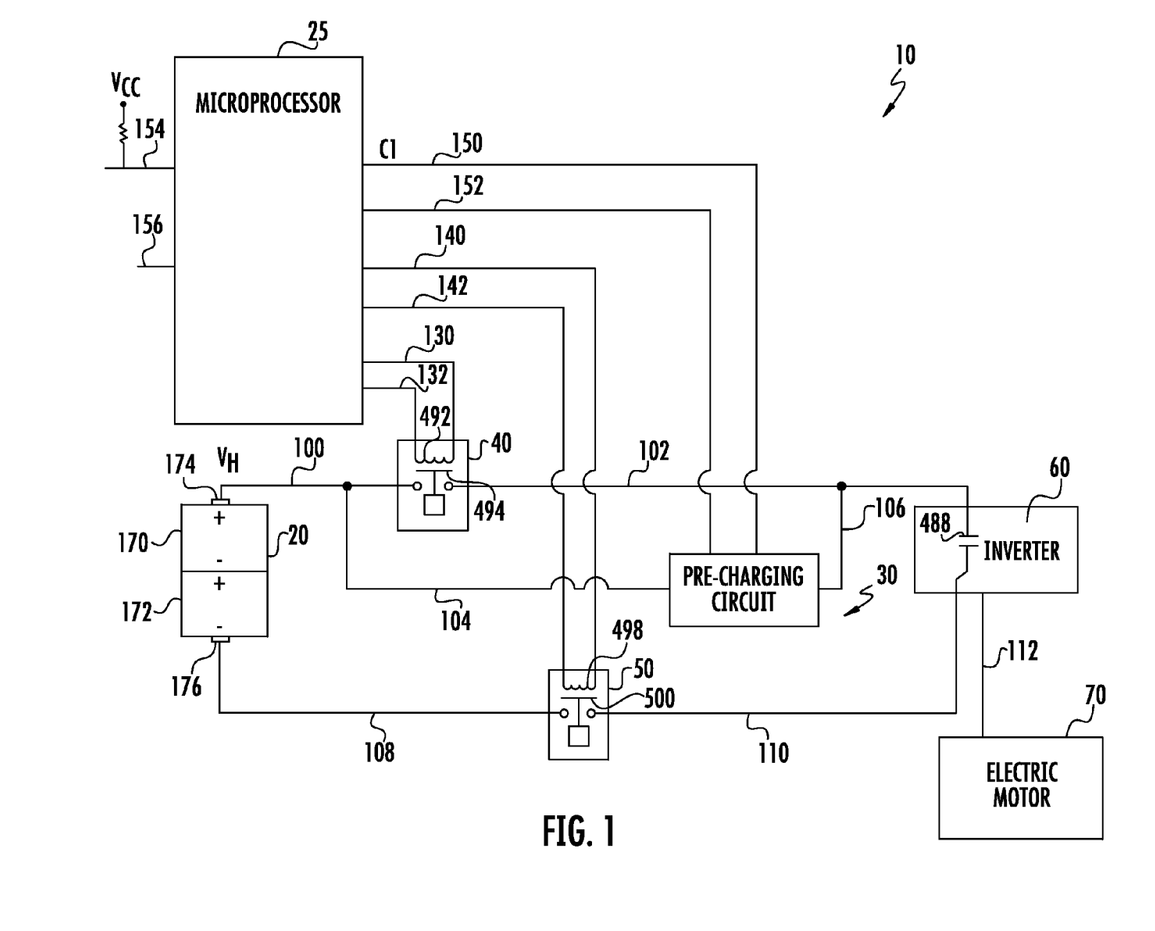
FIG. 1 is a block diagram of an electric vehicle having a pre-charging system in accordance with an exemplary embodiment.
Figure 2:
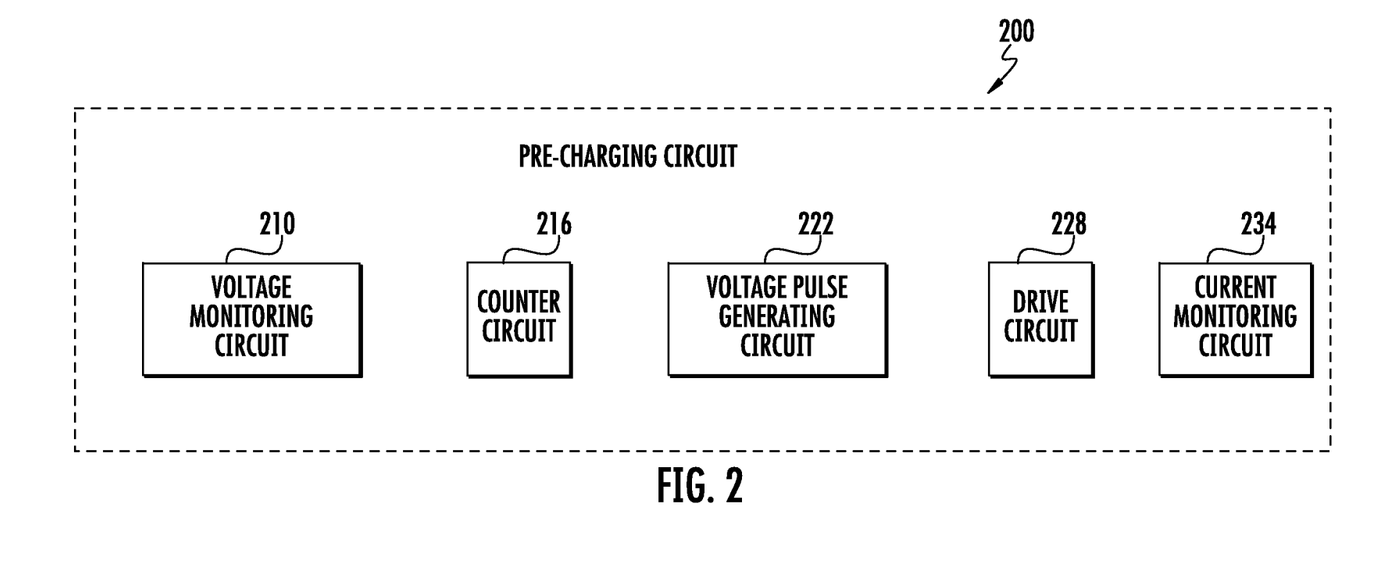
FIG. 2 is a block diagram of a pre-charging circuit utilized in the pre-charging system of FIG. 1.

Referring to FIGS. 1 and 2, an electric vehicle 10 having a pre-charging system 30 in accordance with an exemplary embodiment for pre-charging a capacitor 488 in a voltage inverter 60 for an electric motor 70. The electric vehicle 10 further includes a battery pack 20, a microprocessor 25, a main contactor 40, a grounding contactor 50, the voltage inverter 60, an electric motor 70, electrical lines 100, 102, 104, 106, 108, 110, 112, 130, 132, 140, 142, 150, 152. An advantage of the pre-charging system 30 is that the system 30 charges the capacitor 488 in the voltage inverter 60 while limiting an instantaneous current level flowing through the pre-charging resistor 428 (shown in FIG. 3) electrically coupled to the capacitor 488. The pre-charging system 30 charges the capacitor 488 so that when the main contactor 40 subsequently supplies a high voltage from the battery pack 20 to the capacitor 488, an amount of instantaneous inrush current is reduced.

Before explaining the structure and operation of the electric vehicle 10, a brief explanation of some of the terms utilized herein will be provided.

The term "high logic voltage" refers to a voltage that corresponds to a Boolean logic value of "1." The term "low logic voltage" refers to a voltage that corresponds to a Boolean logic value of "0." The term "output voltage" can correspond to a high logic voltage or a low logic voltage.

The battery pack 20 is configured to output an operational voltage to the voltage inverter 60 which outputs operational voltages to the electric motor 70 via the electrical lines 112. The battery pack 20 includes battery modules 170, 172 electrically coupled in series with one another. The battery pack 20 further includes a high-voltage terminal 174 and a ground terminal 176.

The microprocessor 25 is programmed to generate control signals to control operation of the main contactor 40, the grounding contactor 50, and the pre-charging circuit 30. In particular, the microprocessor 25 is programmed to generate a control signal to induce the grounding contactor 50 to have a closed operational position, and to induce the pre-charging circuit 30 to charge the capacitor 488 when the grounding contactor 50 has the closed operational position. The microprocessor 25 is further programmed to generate a control signal to induce the main contactor 40 to have a closed operational position when the charging of the capacitor 488 is completed.

The microprocessor 25 is electrically coupled to the grounding contactor 50 via the electrical lines 140, 142. The grounding contactor 50 includes a grounding contactor coil 498 and a contact 500. The microprocessor 25 is programmed to generate a high logic voltage on the electrical lines 140, 142 to energize the grounding contactor coil 498 to induce the contact 500 to move to a closed operational position. When the contact 500 has the closed operational position, a second end of the capacitor 488 is electrically coupled to the ground terminal 176 of the battery pack 20. The pre-charging circuit 30 charges the capacitor 488 when the grounding contactor 50 has the closed operational position as will be discussed in further detail below. After the capacitor 488 is charged, the microprocessor is programmed to stop generating the high logic voltage on the electrical lines 140, 142 to de-energize the grounding contactor coil 488 to induce the contact 500 to have an open operational position.

The microprocessor 25 is electrically coupled to the main contactor 40 via the electrical lines 130, 132. The main contactor 40 includes a main contactor coil 492 and a contact 494. The microprocessor 25 is programmed to generate a high logic voltage on the electrical lines 130, 132 to energize the main contactor coil 492 to induce the contact 494 to move to a closed operational position. When the contact 494 has the closed operational position, a first end of the capacitor 488 is electrically coupled to the high voltage terminal 174 of the battery pack 20. When both of the contacts 494, 500 have closed operational positions, the voltage inverter 60 is electrically coupled between the high voltage terminal 174 and the ground terminal 176 of the battery pack 20, to supply operational voltages to the electric motor 70.

Figure 3:
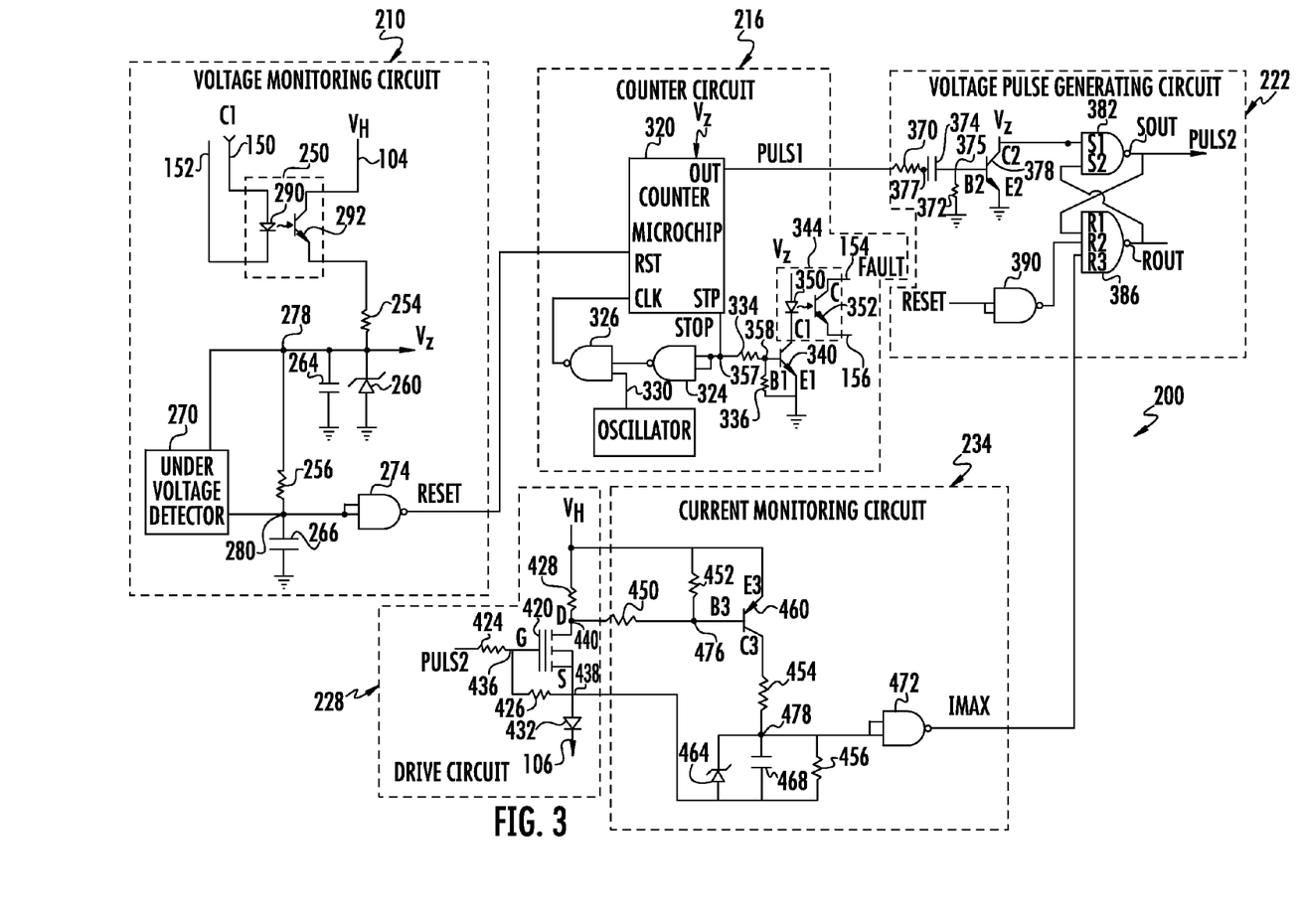
FIG. 3 is a circuit schematic of the pre-charging circuit of FIG. 2 having a voltage monitoring circuit, a counter circuit, a voltage pulse generating circuit, a drive circuit, and a current monitoring circuit.

Referring to FIGS. 1-3, the pre-charging system 30 will now be discussed in further detail. The pre-charging system 30 is configured to charge the capacitor 488 in the voltage inverter 60 while limiting an amount of instantaneous current flowing through the pre-charging resistor 428 to the capacitor 488. The pre-charging system 30 includes the microprocessor 25 and the pre-charging circuit 200.

The pre-charging circuit 200 is provided to charge the capacitor 488 of the voltage inverter 60. The pre-charging circuit 200 includes a voltage monitoring circuit 210, a counter circuit 216, a voltage pulse generating circuit 222, a drive circuit 228, and a current monitoring circuit 234.

Voltage Monitoring Circuit

Figures 4, 5, 6, 7:
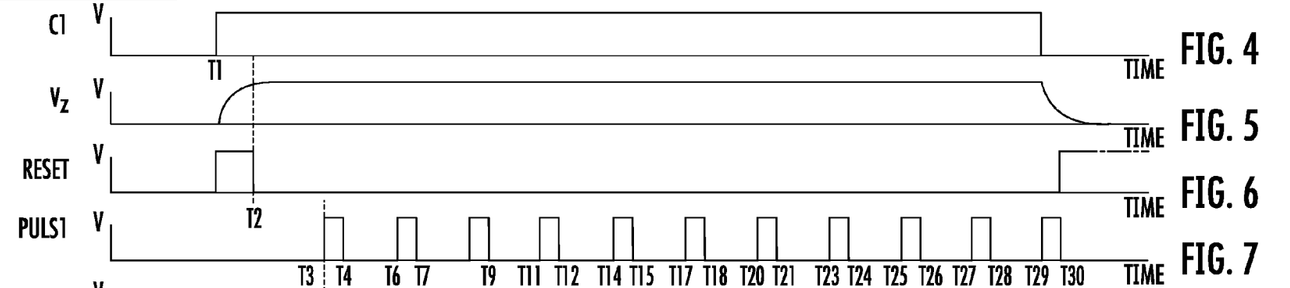
FIG. 4 is a signal schematic of a first control signal generated by a microprocessor in the pre-charging system of FIG. 1 during a first time period for charging a capacitor.
FIG. 5 is a signal schematic of an operational voltage generated by the voltage monitoring circuit of FIG. 3 in response to the first control signal of FIG. 4 during the first time period.
FIG. 6 is a signal schematic of a reset signal generated by the voltage monitoring circuit of FIG. 3 to reset a counter microchip in the counter circuit of FIG. 3 during the first time period.
FIG. 7 is a signal schematic of a first plurality of voltage pulses generated by the counter circuit of FIG. 3 during the first time period.
Figure 8:
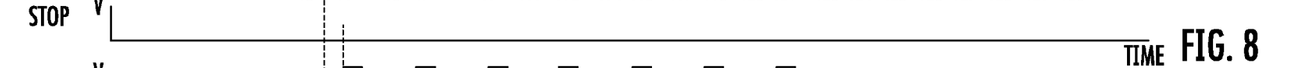
FIG. 8 is a signal schematic of a stop signal generated by the counter circuit of FIG. 3 during the first time period.

Referring to FIGS. 3-6, the voltage monitoring circuit 210 is configured to output an operational voltage Vz (shown in FIG. 5) to the counter circuit 216, the voltage pulse generating circuit 222, the drive circuit 228, and the current monitoring circuit 234, when the microprocessor 25 generates a first control signal C1 having a high logic value (shown in FIG. 4). The voltage monitoring circuit 210 is further configured to output a RESET signal that transitions from a high logic value to a low logic value at a time T2 (shown in FIG. 6) when the operational voltage Vz is greater than or equal to a threshold operational voltage. The voltage monitoring circuit 210 includes an optical isolator 250, resistors 254, 256, a zener diode 260, capacitors 264, 266, and under voltage detector 270, and a NAND gate 274.

Referring to FIGS. 1 and 3, the optical isolator 250 is provided to detect the control voltage C1 (shown in FIG. 4) from the microprocessor 25. The optical isolator 250 includes a light-emitting diode 290 and a transistor 292 therein. The light-emitting diode 290 is electrically coupled to the electrical lines 150, 152 which are further electrically coupled to the microprocessor 25. The transistor 292 is electrically coupled between the electrical line 104 (which is further electrically coupled to the high voltage terminal 174 of the battery pack 20) and the resistor 254.

The resistor 254 is electrically coupled between the emitter of the transistor 292 and a node 278. The zener diode 260 is electrically coupled between the node 278 and electrical ground. During operation, the zener diode 260 limits a voltage level of the operational voltage Vz to a predetermined voltage level. Further, the capacitor 264 is electrically coupled between the node 278 and electrical ground.

Referring to FIGS. 3, 5 and 6, the under voltage detector 270 is configured to generate an output signal having a high logic value when the operational voltage Vz is greater a predetermined operational voltage level, and to transition the output signal to a low logic value when the operational voltage Vz is less than the predetermined operational voltage level. The under voltage detector 270 is electrically coupled between the node 278 and node 280. The resistor 256 is electrically coupled between the node 278 and the node 280. Further, the capacitor 266 is electrically coupled between the node 280 and electrical ground.

The NAND gate 274 has first and second input terminals and an output terminal. The first and second input terminals are electrically coupled to the node 280 which receives the output signal from the under voltage detector 270. The output terminal is electrically coupled to a reset pin RST of the counter microchip 320. When the under voltage detector 270 outputs a high logic voltage indicating the operational voltage Vz has a desired voltage level, the NAND gate 274 outputs a low logic voltage at time T2 (shown in FIG. 6), which is received by the reset pin RST of the counter microchip 320 to reset the counter microchip 320, such that the microchip 320 commences or continues outputting a first plurality of pulses designated as PULS1 (shown in FIG. 7).

Counter Circuit

Referring to FIGS. 3 and 7, the counter circuit 216 is configured to generate a first plurality of voltage pulses (designated as PULS1 in FIG. 7). The counter circuit 216 includes a counter microchip 320, NAND gates 324, 326, an oscillator 330, resistors 334, 336, a transistor 340, and an optical isolator 344.

The microchip 320 has an output pin OUT, a reset pin RST, a stop pin STP, and a clock pin CLK. The reset pin RST is electrically coupled to the output pin of the NAND gate 274 of the voltage monitoring circuit 210. The OUT pin is electrically coupled to a resistor 370 of the voltage pulse generating circuit 222. The STP pin is electrically coupled to a node 357. Further, the CLK pin is electrically coupled to an output pin of the NAND gate 326.

The NAND gate 324 has first and second input terminals and an output terminal. The first and second input terminals of the NAND gate 324 are electrically coupled to the node 357. The output terminal of the NAND gate 324 is electrically coupled to an input terminal of the NAND gate 326.

The NAND gate 326 has first and second input terminals and an output terminal. The first input terminal of the NAND gate 326 is electrically coupled to the output terminal of the NAND gate 324. The second input terminal of the NAND gate 326 electrically coupled to a voltage oscillator 330.

The voltage oscillator 330 is configured to output a first clocking signal that determines a pulse width of each voltage pulse of the first plurality of voltage pulses (designated as PULS1 in FIG. 7)). The NAND gate 326 outputs a second clocking signal to the CLK pin in response to the first clocking signal when the NAND gate 324 outputs a high logic voltage. When the counter microchip 320 determines that a number of voltage pulses of the first plurality of voltage pulses (designated as PULS1 in FIG. 7) is greater than or equal to a threshold number of voltage pulses, the counter microchip 320 outputs a signal STOP from the STP pin. In response, the NAND gate 324 outputs a low logic level voltage. Further, the NAND gate 326 outputs a high logic level voltage and maintains the high logic voltage which induces the counter microchip 320 to stop outputting the first plurality of voltage pulses to indirectly stop charging the capacitor 288. Thereafter, the NAND gate 326 outputs a low logic level voltage if the STP pin outputs a low logic voltage.

The transistor 340 includes a base B1, an emitter E1, and a collector C1. The base B1 is electrically coupled to a node 358. The emitter E1 is electrically coupled to electrical ground. The resistor 334 is electrically coupled between the nodes 357, 358. Further, the resistor 336 is electrically coupled between the node 358 and electrical ground.

The optical isolator 344 includes a light emitting diode 350 and a light controlled transistor 352. The diode 350 is electrically coupled between the collector C1 of the transistor 340 and node 278 such that the diode 350 receives the operational voltage Vz. The light controlled transistor 352 is electrically coupled between the electrical lines 154, 156 that are electrically coupled to the microprocessor 25. When the counter microchip 320 outputs a high logic voltage on the STP pin indicating a number of voltage pulses of the first plurality of voltage pulses exceeded a threshold number of voltage pulses, which further indicates that the capacitor 488 was not successfully charged, the transistor 340 conducts electrical current such that the light emitting diode 350 emits light. In response to the light, the light control transistor 352 conducts electrical current therethrough such that a FAULT signal is received by the microprocessor 25.

Voltage Pulse Generating Circuit

Figures 9, 10:
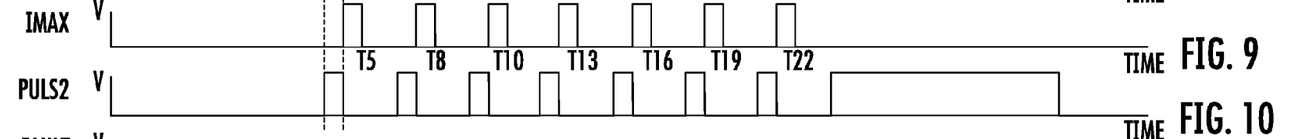
FIG. 9 is a signal schematic of a plurality of voltage pulses generated by the current monitoring circuit when an instantaneous current flowing through a pre-charging resistor is exceeding a threshold instantaneous current level, during the first time period.
FIG. 10 is a signal schematic of a second plurality of voltage pulses generated by the voltage pulse generating circuit of FIG. 3 during the first time period.
Figure 11:
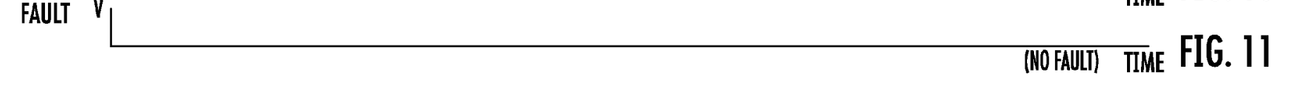
FIG. 11 is a signal schematic of a fault signal generated by the counter circuit of FIG. 1 when a number of voltage pulses of the first plurality of voltage pulses of FIG. 7 exceeds a predetermined number of voltage pulses, during the first time period.
Figures 12, 13:
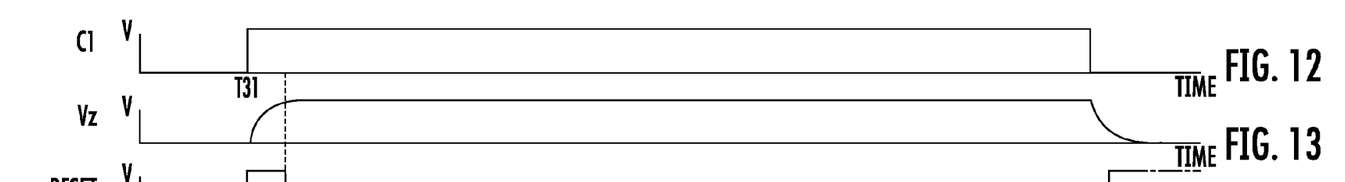
FIG. 12 is a signal schematic of a first control signal generated by a microprocessor in the pre-charging system of FIG. 1 during a second time period for charging a capacitor.
FIG. 13 is a signal schematic of an operational voltage generated by the voltage monitoring circuit of FIG. 3 in response to the first control signal of FIG. 12 during the second time period.
Figures 14, 15:
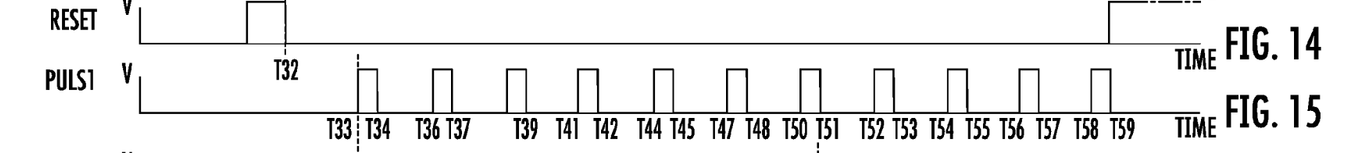
FIG. 14 is a signal schematic of a reset signal generated by the voltage monitoring circuit of FIG. 3 to reset a counter microchip in the counter circuit of FIG. 3 during the second time period, and to prevent output toggling of the voltage pulse generating circuit of FIG. 3 when electrical power is initially applied or removed from the pre-charging circuit of FIG. 3.
FIG. 15 is a signal schematic of a first plurality of voltage pulses generated by the counter circuit of FIG. 3 during the second time period.
Figures 16, 17, 18:
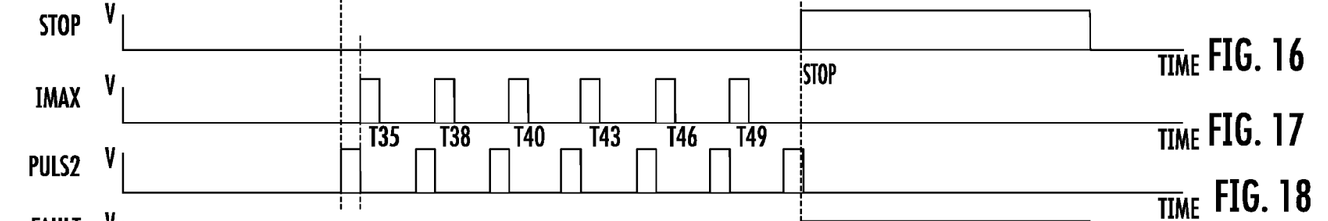
FIG. 16 is a signal schematic of a stop signal generated by the counter circuit of FIG. 3 during the second time period.
FIG. 17 is a signal schematic of a plurality of voltage pulses generated by the current monitoring circuit when an instantaneous current flowing through a pre-charging resistor is exceeding a threshold instantaneous current level, during the second time period.
FIG. 18 is a signal schematic of a second plurality of voltage pulses generated by the voltage pulse generating circuit of FIG. 3 during the second time period, and generation of the second plurality of voltage pulses is stopped to prevent operational damage to the pre-charging circuit since a current level has exceeded an instantaneous current level threshold for a predetermined amount of time.
Figure 19:
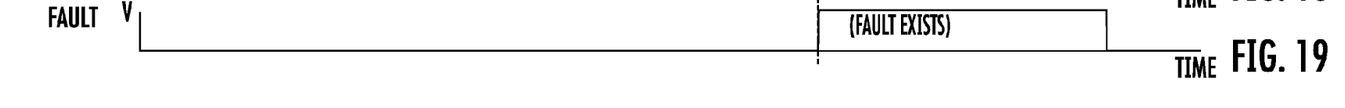
FIG. 19 is a signal schematic of a fault signal generated by the counter circuit of FIG. 1 when a number of voltage pulses of the first plurality of voltage pulses of FIG. 15 exceeds a predetermined number of voltage pulses, during the second time period.

The voltage pulse generating circuit 222 is configured to generate a second plurality of voltage pulses designated as PULS2 (shown in FIG. 10). The voltage pulse generating circuit 222 includes resistors 370, 372, a capacitor 374, a transistor 378, and NAND gates 382, 386, 390.

The transistor 378 includes a base B2, an emitter E2, and a collector C2. The base B2 is electrically coupled to a node 375. The emitter E2 is electrically coupled to electrical ground. The collector C2 is electrically coupled to the node 278 of the voltage monitoring circuit 210 such that the collector C2 receives the operational voltage Vz. The resistor 372 is electrically coupled between the node 375 and electrical ground. The capacitor 374 is electrically coupled between the node 375 and the node 377. The resistor 370 is electrically coupled between the OUT pin of the counter circuit 216 and the node 377. When the second plurality of voltage pulses (PULS2) has a high logic value, the transistor 378 applies a low logic voltage to input terminals S1 and S2 of the NAND gate 382. Alternately, when the second plurality voltage pulses (PULS2) has a low logic value, the transistor 378 applies a high logic voltage to input terminals S1 and S2 of the NAND gate 382.

The NAND gate 382 has input terminals S1 and S2 and an output terminal SOUT. The input terminal S1 is electrically coupled to the collector C2 of the transistor 378. The input terminal S2 is electrically coupled to the output terminal ROUT of the NAND gate 386. The output terminal SOUT of the NAND gate 382 outputs the second plurality of pulses (designated as PULS2 in FIG. 10).

The NAND gate 386 has input terminals R1, R2, R3 and an output terminal ROUT. The input terminal R1 is electrically coupled to the output terminal SOUT of the NAND gate 382. The input terminal R2 is electrically coupled to the output terminal of the NAND gate 390. The input terminal R3 is electrically coupled to the output terminal of the NAND gate 472.

The NAND gate 390 has first and second input terminals and an output terminal. The first and second input terminals of the NAND gate 390 is electrically coupled to the output terminal of the NAND gate 274 of the voltage monitoring circuit 210. When the output pin of the NAND gate 274 outputs a low logic voltage, the output terminal of the NAND gate 390 outputs a high logic voltage that is received by the input terminal R2 of the NAND gate 386. Alternately, when the output pin of the NAND gate 274 outputs a high logic voltage, the output terminal of the NAND gate 390 outputs a low logic voltage that is received by the input terminal R2 of the NAND gate 386.

Referring to FIGS. 3, 9 and 10, the operation of the voltage pulse generating circuit 222 and the current monitoring circuit 234 during a time period when the capacitor 288 is successfully charged will now be explained. At time T3, the counter microchip 320 outputs a high logic voltage and in response the transistor 378 outputs a low logic voltage to the input terminal 51. In response at time T3, the NAND gate 382 outputs a high logic voltage for the PULS2 signal to induce the current monitoring circuit 234 to charge the capacitor 488.

At time T4, the instantaneous current flowing through the pre-charging resistor 428 exceeds a threshold instantaneous current level, and then the transistor 460 turns on and a high logic voltage is applied to the input terminal of the NAND gate 472 of the current monitoring circuit 234. In response, the NAND gate 472 outputs a low logic voltage for the IMAX signal (shown in FIG. 9) which is received by the input terminal R3 of the NAND gate 386 indicating the instantaneous current is greater than or equal to the threshold instantaneous current level. In response, the output terminal ROUT of the NAND gate 386 outputs a high logic voltage that induces the NAND gate 382 to output a low logic voltage at the output terminal SOUT to transition the PULS2 signal to a low logic voltage at time T4. At time T5, the IMAX signal transitions to a low logic voltage.

From time T5 to time T22, the foregoing steps are repeated for the IMAX signal and the PULS2 signal. At time T23, an amount of instantaneous current flowing through the pre-charging resistor 428 does not exceed the threshold instantaneous current level and the IMAX signal is maintained at a low logic voltage, and the PULS2 signal is maintained at a high logic voltage to induce the transistor 420 continue charging the capacitor 488, until the time T30 when the microprocessor 25 transitions the first control signal C1 to a low logic voltage.

Figure 22:
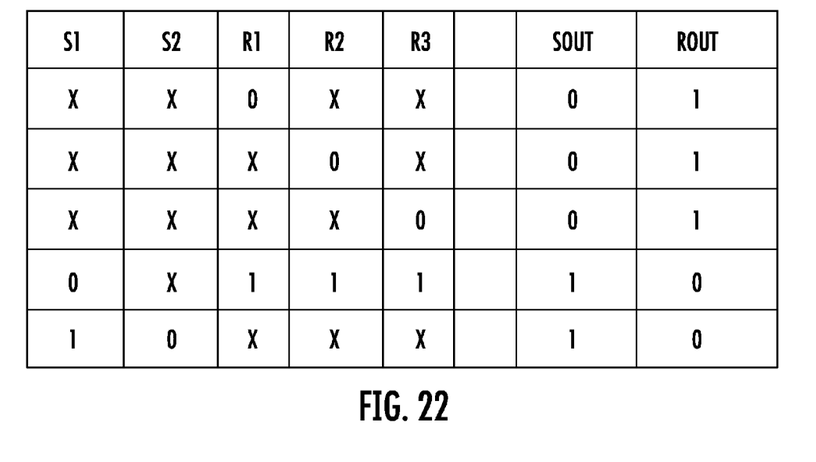
FIG. 22 is a logical truth table associated with the voltage pulse generating circuit of FIG. 3.

Referring to FIGS. 3 and 22, the logical operation of the NAND gates 382 and 386 in the voltage pulse generating circuit 22 is described by the logical truth table. The values designated as "1" designate a high logic voltage, the values designated as "0" indicate a low logic voltage, and the values designated as "X" indicate a don't care value. The input terminals of the NAND gate 382 are designated as S1, S2. The output terminal of the NAND gate 382 is designated as SOUT. The input terminals of the NAND gate 386 are designated as R1, R2, R3. The output terminal of the NAND gate 386 is designated as ROUT. It is noted that when a low logic voltage is applied to any of the input terminals R1, R2, R3, the output terminal SOUT outputs a low logic voltage.

Drive Circuit

Referring to FIGS. 1 and 3, the drive circuit 228 is configured to selectively source current through the pre-charging resistor 428 to the capacitor 488 to charge the capacitor 488. The drive circuit 288 includes a transistor 420, resistors 424, 426, 428, and a diode 432.

The transistor 420 includes a gate G, a drain D, and a source S. The gate G is electrically coupled to the resistor 424 at a node 436. The resistor 424 is electrically coupled between the node 436 and the output terminal of the NAND gate 382 of the voltage pulse generating circuit 222. The source S is electrically coupled to a node 438. The resistor 426 electrically coupled between the node 436 and the node 438. The diode 432 is electrically coupled between a node 438 and the electrical line 106 which is further electrically coupled to the capacitor 488. The diode 432 is a blocking diode that prevents an electrical current from undesirably entering into the battery modules 170, 172 when the pre-charging circuit 200 is not operational. The resistor 428 is electrically coupled between the high voltage terminal 174 the battery pack 20 and the drain D of the transistor 420. When a voltage pulse of the second plurality of voltage pulses (shown in FIG. 10) has a high logic value, the transistor 420 conducts a current through the resistor 428, the transistor 420, and the diode 432 to the capacitor 488 in the voltage inverter 60 to charge the capacitor 488. Alternately, when a voltage pulse of the second plurality of voltage pulses has a low logic value, the transistor 420 stops conducting the current through the resistor 428, the transistor 420, and the diode 432 to the capacitor 488 in the voltage inverter 60.

Current Monitoring Circuit

Referring to FIGS. 3 and 9, the current monitoring circuit 234 is provided to monitor an instantaneous current flowing through the transistor 420 and the pre-charging resistor 428 and to generate an IMAX signal (shown in FIG. 9) having a high logic value when the instantaneous current is greater than a threshold instantaneous current level. Further, the current monitoring circuit 234 transitions the IMAX signal (shown in FIG. 9) to a low logic value when the instantaneous current level is less than or equal to the threshold instantaneous current level.

The current monitoring circuit 234 includes resistors 450, 452, 454, 456, a transistor 460, a zener diode 464, a capacitor 468, and a NAND gate 472. The transistor 460 includes a base B3, an emitter E3, and a collector C3. The base B3 is electrically coupled to a node 476. The emitter E3 is electrically coupled to the high voltage terminal 174 of the battery pack 20. The collector C3 is electrically coupled to the resistor 454. The resistor 452 is electrically coupled between the high voltage terminal 174 the battery pack 20 and the node 476. The resistor 450 is electrically coupled between the node 440 and the node 476. The resistor 454 is electrically coupled between the collector C3 and the node 478. The zener diode 464 is electrically coupled between the node 478 and the node 438. The capacitor 468 is electrically coupled between the node 478 and the node 438. The resistor 456 is electrically coupled between the node 478 and the node 438.

The NAND gate 472 has first and second input terminals and an output terminal. The first and second input terminals of the NAND gate 472 are electrically coupled to the node 478. The output terminal of the NAND gate 472 is electrically coupled to the first input terminal of the NAND gate 386 of the voltage pulse generating circuit 222.

During operation, if an electrical current flowing through the resistor 428 is greater than a threshold instantaneous current level, then the transistor 460 will turn on and conduct an electrical current through the resistor 454 to the parallel combination of the zener diode 464, the capacitor 468, and the resistor 456. As a result, a high logic voltage will be applied to the first and second input terminals of the NAND gate 472 and the output terminal of the NAND gate 472 will output a low logic voltage that is received by the NAND gate 386 of the voltage pulse generating circuit 222. Alternately, if the electrical current flowing through the resistor 428 is less than the threshold instantaneous current level, then the transistor 460 will turn off. As a result, a low logic voltage will be applied to the first and second input terminals of the NAND gate 472 and the output terminal of the NAND gate 472 will output a high logic voltage that is received by the NAND gate 386 of the voltage pulse generating circuit 222.

Referring to FIGS. 4-11, the signal schematics for exemplary signals C1, Vz, RESET, PULS1, STOP, IMAX, PULS2 and FAULT are shown that illustrate the pre-charging circuit 200 successfully charging the capacitor 488.

Referring to FIGS. 3, 12-19, the signal schematics for signals C1, Vz, RESET, PULS1, STOP, IMAX, PULS2 and FAULT are shown illustrating a fault condition (e.g., a short circuit condition) where the pre-charging circuit 200 did not successfully charge the capacitor 488. In particular, at time T51, the counter microchip 320 generates a STOP signal having a high logic voltage indicating that the counter microchip 320 has generated a number of voltage pulses of the first plurality of voltage pulses (designated as PULS1 in FIG. 15) that is greater than or equal to a threshold number of voltage pulses, indicating an unsuccessful charging of the capacitor 488 has occurred. In response, at time T51, the counter circuit 216 generates a FAULT signal having a high logic value which is received by the microprocessor 25.

Figure 20:
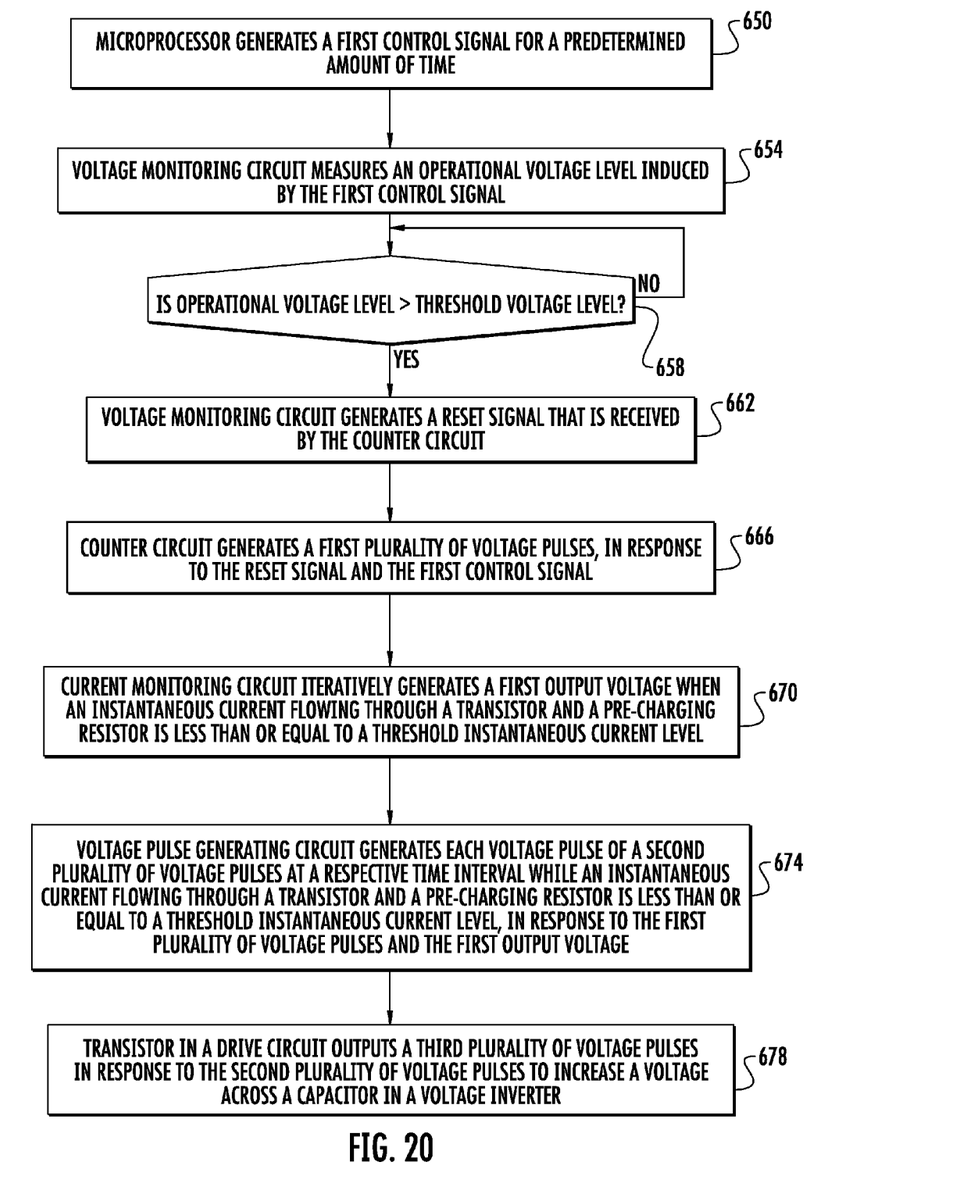
FIGS. 20-21 are flowcharts of a method for charging a capacitor in a voltage inverter for an electric motor in accordance with another exemplary embodiment.

Referring to FIG. 20, a flowchart of a method for charging the capacitor 488 in the voltage inverter 60 will now be described.

At step 650, the microprocessor 25 generates a first control signal C1 (shown in FIG. 4) having a high logic voltage. After step 650, the method advances to step 654.

At step 654, the voltage monitoring circuit 210 measures an operational voltage level Vz (shown in FIG. I) induced by the first control signal C1. After step 654, the method advances to step 658.

At step 658, the voltage monitoring circuit 210 makes a determination as to whether the operational voltage level Vz is greater than a threshold operational voltage level. If the operational voltage level Vz is greater than the threshold operational voltage level, then the method advances to step 662. Otherwise, the method returns to step 658.

At step 662, the voltage monitoring circuit 210 generates a reset signal RESET (shown in FIG. 6) that is received by the counter circuit 216. After step 662, the method advances to step 666.

At step 666, the counter circuit 216 generates a first plurality of voltage pulses PULS1, in response to the reset signal RESET (shown in FIG. 6) and the first control signal C1 (shown in FIG. 1). After step 666, the method advances to step 670.

At step 670, the current monitoring circuit 234 iteratively generates a first output voltage when an instantaneous current flowing through the transistor 420 and the pre-charging resistor 428 is less than or equal to a threshold instantaneous current level.

At step 674, the voltage pulse generating circuit 22 generates each voltage pulse of a second plurality of voltage pulses (shown in FIG. 10) at a respective time interval while an instantaneous current flowing through the transistor 420 and the pre-charging resistor 428 is less than or equal to a threshold instantaneous current level, in response to the first plurality of voltage pulses and the first output voltage.

At step 678, the transistor 420 in the drive circuit 228 outputs a third plurality of voltage pulses in response to the second plurality of voltage pulses to increase a voltage across the capacitor 488 in the voltage inverter 60.

Figure 21:
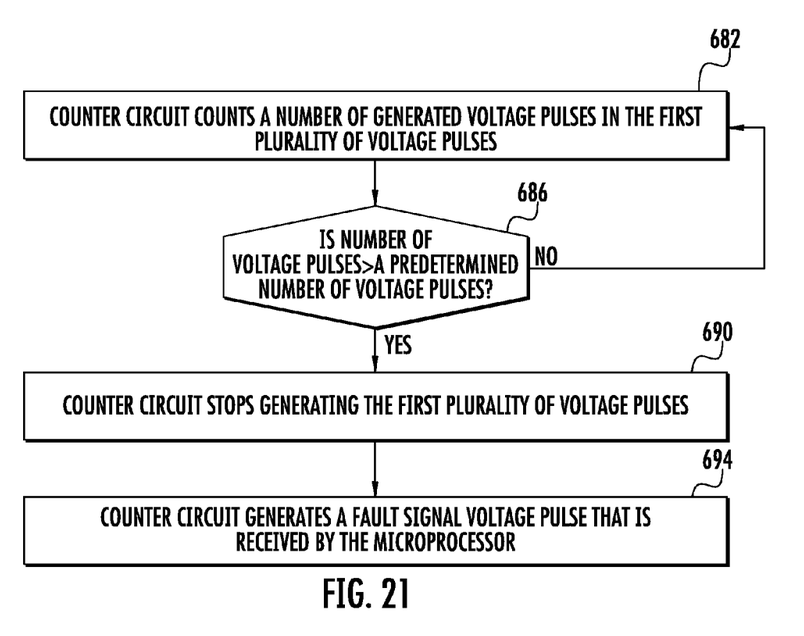

Referring to FIG. 21, a flowchart of another method that is also performed with the method of FIG. 20, will now be described.

At step 682, the counter circuit 216 counts a number of generated voltage pulses in the first plurality of voltage pulses PULS1, (shown in FIG. 7). After step 682, the method advances to step 686.

At step 686, the counter circuit 216 makes a determination as to whether the number of voltage pulses is greater than a predetermined number of voltage pulses. If the number of voltage pulses is greater than a predetermined number of voltage pulses, the method advances to step 690. Otherwise, the method advances to step 682.

At step 690, the counter circuit 216 stops generating the first plurality of voltage pulses. After step 690, the method advances to step 694.

At step 694, the counter circuit 216 generates a fault signal FAULT that is received by the microprocessor 25.

The pre-charging system and the method provide a substantial advantage over other systems and methods. In particular, the pre-charging system and the method provide a technical effect of charging a capacitor in a voltage inverter for an electric motor while limiting instantaneous current level flowing through a pre-charging resistor electrically coupled to the capacitor.

The above-described method can be at least partially embodied in the form of one or more computer readable media having computer-executable instructions for practicing the methods. The computer-readable media can comprise one or more of the following: hard drives, RAM memory, flash memory, and other computer-readable media known to those skilled in the art; wherein, when the computer-executable instructions are loaded into and executed by one or more microprocessors, the one or more microprocessors become an apparatus for practicing at least a portion of the methods.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A pre-charging system for a capacitor in a voltage inverter for an electric motor, comprising:
   a microprocessor programmed to generate a first control signal;
   a pre-charging circuit operably coupled to the microprocessor, the pre-charging circuit having a counter circuit, a voltage pulse generating circuit, and a drive circuit;
   the counter circuit configured to generate a first plurality of voltage pulses, in response to the first control signal;
   the voltage pulse generating circuit configured to generate each voltage pulse of a second plurality of voltage pulses at a respective time interval while an instantaneous current flowing through a transistor and a pre-charging resistor electrically coupled to the capacitor is less than or equal to a threshold instantaneous current level;
   the drive circuit having the transistor and the pre-charging resistor electrically coupled to the transistor, the transistor configured to be electrically coupled between a high voltage terminal of a battery pack and the capacitor in the voltage inverter, the transistor configured to output a third plurality of voltage pulses in response to the second plurality of voltage pulses to increase a voltage across the capacitor in the voltage inverter;
   the counter circuit is further configured to count a number of voltage pulses of the first plurality of voltage pulses; and
   the counter circuit is further configured to generate a stop signal to induce the counter circuit to stop generating the first plurality of voltage pulses such that the pre-charging circuit stops charging the capacitor in the voltage inverter if the number of voltage pulses is greater than a predetermined number of voltage pulses indicating that the capacitor in the voltage inverter was not successfully pre-charged.

2. The pre-charging system of claim 1, wherein the pre-charging circuit further comprises a current monitoring circuit configured to generate a first output voltage if the instantaneous current flowing through the transistor and the pre-charging resistor is less than or equal to the threshold instantaneous current level.

3. The pre-charging system of claim 2, wherein the voltage pulse generating circuit is configured to generate each voltage pulse of the second plurality of voltage pulses at the respective time interval if the voltage pulse generating circuit receives the first output voltage from the current monitoring circuit indicating that the instantaneous current flowing through the transistor and the pre-charging resistor is less than or equal to the threshold instantaneous current level.

4. The pre-charging system of claim 1, wherein the counter circuit is further configured to generate a fault signal indicating that the capacitor was not successfully pre-charged, in response to the stop signal, that is received by the microprocessor.

5. The pre-charging system of claim 1, wherein:
the microprocessor is further programmed to stop generating the first control signal; and
the counter circuit is further configured to stop generating the first plurality of pulses in response to stopping the generation of the first control signal.

6. A method for pre-charging a capacitor in a voltage inverter for an electric motor, comprising:
providing a pre-charging system having a microprocessor and a pre-charging circuit operably coupled to the microprocessor, the pre-charging circuit having a counter circuit, a voltage pulse generating circuit, and a drive circuit; the drive circuit having a transistor and a pre-charging resistor electrically coupled to the transistor, the transistor configured to be electrically coupled between a high voltage terminal of a battery pack and the capacitor;
generating a first control signal utilizing the microprocessor;
generating a first plurality of voltage pulses, in response to the first control signal, utilizing the counter circuit;
generating a first output voltage utilizing a current monitoring circuit if an instantaneous current flowing through the transistor and the pre-charging resistor is less than or equal to a threshold instantaneous current level;
generating each voltage pulse of a second plurality of voltage pulses utilizing the voltage pulse generating circuit, at a respective time interval if the voltage pulse generating circuit receives the first output voltage indicating that the instantaneous current flowing through the transistor and the pre-charging resistor is less than or equal to the threshold instantaneous current level during the respective time interval; and
outputting a third plurality of voltage pulses utilizing the transistor in response to the second plurality of voltage pulses to increase a voltage across the capacitor in the voltage inverter.

7. The method of claim 6, further comprising:
counting a number of voltage pulses of the first plurality of voltage pulses utilizing the counter circuit; and
generating a stop signal utilizing the counter circuit to induce the counter circuit to stop generating the first plurality of voltage pulses if the number of voltage pulses is greater than a predetermined number of voltage pulses indicating that the capacitor in the voltage inverter was not successfully pre-charged.

8. The method of claim 7, further comprising generating a fault signal indicating that the capacitor was not successfully pre-charged utilizing the counter circuit, in response to the stop signal, the fault signal being received by the microprocessor.

9. The method of claim 6, further comprising:
stopping the generation of the first control signal utilizing the microprocessor; and
stopping the generating of the first plurality of pulses in response to stopping the generation of the first control signal, utilizing the counter circuit.

10. A pre-charging system for a capacitor in a voltage inverter for an electric motor, comprising:
a microprocessor programmed to generate a first control signal;
a pre-charging circuit operably coupled to the microprocessor, the pre-charging circuit having a counter circuit, a voltage pulse generating circuit, and a drive circuit;
the counter circuit configured to generate a first plurality of voltage pulses, in response to the first control signal;
a current monitoring circuit configured to iteratively generate a signal if an instantaneous current flowing through a transistor and a pre-charging resistor is less than or equal to a threshold instantaneous current level, that is received by the voltage pulse generating circuit;
the voltage pulse generating circuit configured to generate each voltage pulse of a second plurality of voltage pulses at a respective time interval if the instantaneous current flowing through the transistor and the pre-charging resistor electrically coupled to the capacitor is less than or equal to the threshold instantaneous current level during the respective time interval; and
the drive circuit having the transistor and the pre-charging resistor electrically coupled to the transistor, the transistor configured to be electrically coupled between a high voltage terminal of a battery pack and the capacitor in the voltage inverter, the transistor configured to output a third plurality of voltage pulses in response to the second plurality of voltage pulses to increase a voltage across the capacitor in the voltage inverter.

* * * * *